US005955254A

United States Patent [19]

Lapp

[11] Patent Number: 5,955,254

[45] Date of Patent: Sep. 21, 1999

[54] PRODUCTION OF SILVER HALIDE EMULSIONS

[75] Inventor: Otto Lapp, Bergisch Gladbach, Germany

[73] Assignee: Agfa-Gevaert AG, Germany

[21] Appl. No.: 08/975,571

[22] Filed: Nov. 21, 1997

[30] Foreign Application Priority Data

Nov. 29, 1996 [DE] Germany ............................ 196 49 657

[51] Int. Cl.[6] .......................... G03C 1/015; G03C 1/025; C01G 5/02

[52] U.S. Cl. ............................ 430/569; 430/567; 423/38; 423/46; 423/42

[58] Field of Search .................................... 430/569, 567; 423/38, 46, 42

[56] References Cited

U.S. PATENT DOCUMENTS

| | | | |
|---|---|---|---|
| 4,140,530 | 2/1979 | Trunley et al. | 430/569 |
| 4,146,399 | 3/1979 | Trunley et al. | 430/546 |
| 5,180,651 | 1/1993 | Mason | 430/138 |
| 5,494,789 | 2/1996 | Daubendiek et al. | 430/567 |

OTHER PUBLICATIONS

Ullmann's Encyclopedia of Industrial Chemistry, vol. A 20, VCH Verlagsgesellschaft mbH, D–6940 Weinheim 1992, Photography, pp. 28 to 40.

Res. Discl. 38957, p. 592, Sep. 1996.

*Primary Examiner*—Mark F. Huff
*Attorney, Agent, or Firm*—Connolly & Hutz

[57] ABSTRACT

The production of a silver halide emulsion in an aqueous protective colloid solution by the reaction of, on the one hand, silver nitrate, and, on the other, at least one water-soluble halide, may be performed particularly simply and with great apportioning accuracy, if, during at least part of the precipitation, at least the predominant part of one reactant is added in the form of a solid salt to the aqueous protective colloid solution.

12 Claims, No Drawings

PRODUCTION OF SILVER HALIDE EMULSIONS

This invention relates to a process for the production of silver halide emulsions which is in principle novel and is distinguished by particular technical simplicity and great accuracy of apportioning.

Silver halide emulsions for photographic materials are produced by precipitating the silver halide in a protective colloid solution, conventionally a gelatine solution, wherein either one reaction partner is initially present in the protective colloid solution and the other is added in the form of an aqueous solution or aqueous solutions of both reactants are simultaneously added to the protective colloid solution. The process and the variants thereof are exhaustively described in *Ullmann's Encyclopedia of Industrial Chemistry*, volume A 20, VCH Verlags-gesellschaft mbH, D-6940 Weinheim, 1992*, Photography*, pages 28 to 40.

The technical complexity of producing silver halice emulsions has increased over the course of time. In particular, great technical effort has been and still is being devoted to exactly apportioning the reaction solutions and mixing them. A feature common to all known processes is that they start from solutions of the reactants, generally from aqueous silver salt and halide solutions, and these are combined in the presence of a protective colloid, generally gelatine, wherein the silver halides spontaneously crystallise in the form of microcrystals.

So-called $P_{Ag}$-controlled processes, wherein the silver salt and halide solutions must be apportioned in a precisely defined quantity ratio relative to each other, are of particular significance in this connection. The accuracy with which volume is apportioned is here dependent upon the accuracy of the metered quantity of water and upon the density of the solutions, which varies with the salt concentration.

Due to the very rapid ionic reaction between the silver and halide ions, defined and reproducible mixing of the reactants is also of great importance, especially in the first, so-called nucleation phase. Depending upon the intensity of mixing, variable quantities and sizes of silver halide microcrystals are formed. There are many technical options for apportioning and mixing the reactants for the production of photographic emulsions [*Res. Discl.* 38957, page 592, September 1996].

Performing similar mixing processes in vessels of differing size is known to be highly problematic. This means that formulations for the production of photographic emulsions must frequently be modified at high cost when passing from the laboratory scale to larger precipitation vessels.

The object of the invention was to provide a silver halide precipitation process which is distinguished by technical simplicity while being superior to previous processes with regard to accuracy of apportioning and reproducibility.

This object is surprisingly achieved by, during at least part of the precipitation, adding at least the predominant part of one reactant in the form of a solid salt to the aqueous protective colloid solution. The predominant part of all the reactants is preferably added as solid salts to the aqueous protective colloid solution with vigorous stirring, instead of in the form of solutions, and preferably as a homogeneous, solid mixture.

A predominant part is taken to mean more than 5 wt. %, in particular more than 80 wt. % and most preferably more than 90 wt. % of the total quantity of the reactants used for the particular precipitation stage.

Since the solid water soluble salts must first dissolve before the resultant ions may react any further, and this dissolution does not proceed spontaneously, the salt crystals are largely homogeneously distributed throughout the entire reaction volume, i.e. the volume of the vessel, by the vigorous stirring, and so dissolve. Only then do the ions formed react to yield the solid silver halide microcrystals. By adding solids, it is thus simply possible to perform apportioning, mixing and precipitation in a temporally and spatially more defined manner than when adding solutions.

The solid salts may also be introduced into the protective colloid solution in the form of readily apportioned tablets, wherein tablets are taken to be objects of identical shape and size, by means of which a defined quantity of at least one of the reactants is introduced into the protective colloid solution with each tablet. The tablets may contain either only one reactant or two or more reactants, in particular all the reactants in an intimate mixture in the pre-selected quantity ratios.

The tablets may furthermore contain agents which facilitate particularly ready dissolution and vigorous mixing in the protective colloid solution (so-called effervescent effect), for example a bicarbonate and a solid organic acid such as citric acid.

Since the solids amount to only a fraction of the volume of the solutions, it is also possible to produce the silver halide emulsions with virtually constant volume ratios. In contrast, in the conventional precipitation process, the volume in the precipitation vessel is constantly increasing by the volume of the incoming silver nitrate and halide solutions, so resulting in constantly changing mixture ratios.

Adding solids is furthermore distinguished by elevated accuracy as the reactants are prepared gravimetrically and may be apportioned in any freely selectable ratio, which then, in the case of the homogeneous solid mixture, remains absolutely constant. The process according to the invention may also be used in combination with conventional methods. In particular, $P_{Ag}$-control may be achieved by means of a separate aqueous control solution in the form of a halide or silver nitrate solution.

In its simplest form, apportioning of solids may proceed using the hourglass principle. Apportioning methods using metering belt balances or conveying screws or the like are, however, also suitable. The rate of addition may be changed both step-wise and continuously. It is also possible to dispense with the inlet vessels for preparing the conventional solutions together with the temperature control and metering apparatus for the solutions.

The solids used should advantageously be dry in order, on the one hand, to facilitate exact apportioning and, on the other, to avoid any reaction in the solid mixture. It is thus possible, for example, to heat the solids or to add desiccants thereto.

A premature reaction in the solid mixture may also be avoided by sufficient cooling of the mixture. Dry ice may thus, for example, be added to the solids.

It is furthermore advantageous for purposes of the novel process for the salts used to have maximally similar molar dissolution behavior, which may be achieved by adjusting the grain size of the salts. Molar dissolution behavior is taken to mean the molar quantity of the particular reactant dissolving per unit volume and unit time under identical concentration and temperature conditions.

Any known methods to achieve specific grain sizes, specific halide composition, specific halide gradients within the AgX grain may be used in the process according to the invention.

It is particularly advantageous to use the process according to the invention to produce so-called nucleus precipitates, i.e. silver halide emulsions already having the grain number and grain size distribution of the subsequently used emulsion. Further precipitation is achieved by adding in a known manner further silver nitrate and further water-soluble halide under conditions in which grain growth occurs, but no new nuclei are formed, unless this is desired.

The silver halide emulsions produced according to the invention are suitable for all types of photosensitive silver halide materials, for example for black-&-white recording and print materials, materials for the printing industry and X-ray materials.

Examples of colour photographic materials are colour negative films, colour reversal films, colour positive films, colour photographic paper, colour reversal photographic paper, colour sensitive materials for the dye diffusion transfer process or the silver dye bleaching process.

The photographic materials consist of a support onto which at least one photosensitive silver halide emulsion layer is applied. Thin films and sheets are in particular suitable as supports. A review of support materials and the auxiliary layers applied to the front and reverse sides of which is given in *Research Disclosure* 37254, part 1 (1995), page 285.

The colour photographic materials conventionally contain at least one red-sensitive, one green-sensitive and one blue-sensilive silver halide emulsion layer, optionally together with interlayers and protective layers.

Depending upon the nature of the photographic materials, these layers may be differently arranged. This is demonstrated for the most important products:

Colour photographic films such as colour negative films and colour reversal films have on the support, in the sequence stated below, 2 or 3 red-sensitive, cyan-coupling silver halide emulsion layers, 2 or 3 green-sensitive, magenta-coupling silver halide emulsion layers and 2 or 3 blue-sensitive, yellow-coupling silver halide emulsion layers. The layers of identical spectral sensitivity differ with regard to their photographic sensitivity, wherein the less sensitive partial layers are generally arranged closer to the support than the more highly sensitive partial layers.

A yellow filter layer is conventionally arranged between the green-sensitive and blue-sensitive layers so preventing blue light from reaching the underlying layers.

Possible options for different layer arrangements and the effects thereof on photographic properties are described in *J. Inf. Rec. Mats.*, 1994, volume 22, pages 183–193.

Colour photographic paper, which is usually substantially less photosensitive than a colour photographic film, conventionally has on the support, in the sequence stated below, one blue-sensitive, yellow-coupling silver halide emulsion layer, one green-sensitive, magenta-coupling silver halide emulsion layer and one red-sensitive, cyan-coupling silver halide emulsion layer; the yellow filter layer may be omitted.

The number and arrangement of the photosensitive layers may be varied in order to achieve specific results. For example, all high sensitivity layers may be grouped together in one package of layers and all low sensitivity layers may be grouped together in another package of layers in order to increase sensitivity (DE-25 30 645).

The substantial constituents of the photographic emulsion layers are binder, silver halide grains and colour couplers.

Details of suitable binders may be found in *Research Disclosure* 37254, part 2 (1995), page 286.

Details of suitable silver halide emulsions, the production, ripening, stabilisation and spectral sensitisation thereof, including suitable spectral sensitisers, may be found in *Research Disclosure* 37254, part 3 (1995), page 286 and in *Research Disclosure* 37038, part XV (1995), page 89.

Photographic materials with camera sensitivity conventionally contain silver bromide-iodide emulsions, which may optionally also contain small proportions of silver chloride. Photographic print materials contain either silver chloride-bromide emulsions with up to 80 wt. % of AgBr or silver chloride-bromide emulsions with above 95 mol. % of AgCl.

Details relating to coloUr couplers may be found in *Research Disclosure* 37254, part 4 (1995), page 288 and in *Research Disclosure* 37038, part II (1995), page 80. The maximum absorption of the dyes formed from the couplers and the developer oxidation product is preferably within the following ranges: yellow coupler 430 to 460 nm, magenta coupler 540 to 560 nm, cyan coupler 630 to 700 nm.

In order to improve sensitivity, grain, sharpness and colour separation in coloUr photographic films, compounds are frequently used which, on reaction with the developer oxidation product, release photographically active compounds, for example DIR couplers which eliminate a development inhibitor.

Details relating to such compounds, in particular couplers, may be found in *Research Disclosure* 37254, part 5 (1995), page 290 and in *Research Disclosure* 37038, part XIV (1995), page 86.

Colour couplers, which are usually hydrophobic, as well as other hydrophobic constituents of the layers, are conventionally dissolved or dispersed in high-boiling organic solvents. These solutions or dispersions are then emulsified into an aqueous binder solution (conventionally a gelatine solution) and, once the layers have dried, are present as fine droplets (0.05 to 0.8 $\mu$m in diameter) in the layers.

Suitable high-boiling organic solvents, methods for the introduction thereof into the layers of a photographic material and further methods for introducing chemical compounds into photographic layers may be found in *Research Disclosure* 37254, part 6 (1995), page 292.

The non-photosensitive interlayers generally located between layers of different spectral sensitivity may contain agents which prevent an undesirable diffusion of developer oxidation products from one photosensitive layer into another photosensitive layer with a different spectral sensitisation.

Suitable compounds (white couplers, scavenger or DOP scavengers) may be found in *Research Disclosure* 37254, part 7 (1995), page 292 and in *Research Disclosure* 37038, part III (1995), page 84.

The photographic material may also contain UV light absorbing compounds, optical whiteners, spacers, filter dyes, formalin scavengers, light stabilisers, antioxidants, $D_{min}$ dyes, additives to improve stabilisation of dyes, couplers and whites and to reduce colour fogging, plasticisers (latices), biocides and others.

Suitable compounds may be found in *Research Disclosure* 37254, part 8 (1995), page 292 and in *Research Disclosure* 37038, parts IV, V, VI, VII, X, XI and XIII (1995), pages 84 et seq.

The layers of colour photographic materials are conventionally hardened, i.e. the binder used, preferably gelatine, is crosslinked by appropriate chemical methods.

Suitable hardener substances may be found in *Research Disclosure* 37254 part 9 (1995), page 294 and in *Research Disclosure* 37038, part XII (1995), page 86.

Once exposed with an image, colour photographic materials are processed using different processes depending upon their nature. Details relating to processing methods and the necessary chemicals are disclosed in *Research Disclosure* 37254, part 10 (1995), page 294 and in *Research Disclosure* 37038, parts XVI to XXIII (1995), pages 95 et seq. together with example materials.

EXAMPLES

Emulsion 1 (Invention)

| | |
|---|---|
| Initial mixture: | 750 ml of $H_2O$<br>5.5 g of inert bone gelatine (oxidised)<br>4 g of KBr |

1.8 g of solid $AgNO_3$ and 1.3 g of solid KBr were simultaneously added to this initial mixture at 30° C. within 10 seconds with vigorous stirring. Grain size and the grain size distribution range were then determined.

Emulsion 2 (Invention)

Emulsion 2 was produced in the same manner as emulsion 1, with the difference that the solid salts were homogeneously mixed together before addition to initial mixture.

Emulsion 3 (Comparison)

| | | |
|---|---|---|
| Initial mixture: | 750 ml of $H_2O$<br>5.5 g of inert bone gelatine (oxidised)<br>4 g of KBr | |
| Solution 1: | 20 ml of $H_2O$<br>1.8 g of $AgNO_3$ | 20° C. |
| Solution 2: | 20 ml of $H_2O$<br>1.3 g of KBr | 20° C. |

Solutions 1 and 2 were simultaneously added to this initial mixture at 30° C. within 30 seconds with vigorous stirring. Grain size and the grain size distribution range were then determined.

Emulsion 4 (Invention)

| | |
|---|---|
| Initial mixture: | 500 ml of $H_2O$<br>40 g of inert bone gelatine<br>1 ml of aqueous NaCl solution (2.5 wt. %) |

A homogeneous mixture of 20 g of solid $AgNO_3$ and 7 g of solid NaCl were simultaneously added to this initial mixture at 40° C. and pH 4.7 within 8 minutes with vigorous stirring using the hourglass principle. The mixture container was cooled with dry ice during addition. On completion of addition, digestion was continued for a further 20 minutes at 40° C. Grain size and the grain size distribution range were then determined.

Emulsion 5 (Comparison)

| | | |
|---|---|---|
| Initial mixture: | 500 ml of $H_2O$<br>40 g of inert bone gelatine<br>1 ml of aqueous NaCl solution (2.5 wt. %) | |
| Solution 1: | 500 ml of $H_2O$<br>20 g of $AgNO_3$ | 40° C. |
| Solution 2: | 500 ml of $H_2O$<br>7 g of NaCl | 40° C. |

Solutions 1 and 2 were simultaneously added to the initial mixture at 40° C. and pH 4.7 within 8 minutes with vigorous stirring.

After 20 minutes' digestion at 40° C., grain size and the grain size distribution range were determined.

Emulsion 6 (Invention)

| | |
|---|---|
| Initial mixture: | 1.5 l of $H_2O$<br>13.5 g of inert bone gelatine |

A homogeneous mixture of 100 g of solid $AgNO_3$ and 75 g of solid KBr was added within 30 minutes using a conveying screw to this initial mixture at 30° C. with vigorous stirring.

Grain size and the grain size distribution range were then determined.

Emulsion 7 (Comparison)

| | | |
|---|---|---|
| Initial mixture: | 780 ml of $H_2O$<br>13.5 g of inert bone gelatine | |
| Solution 1: | 360 ml of $H_2O$<br>100 g of $AgNO_3$ | 20° C. |
| Solution 2: | 360 ml of $H_2O$<br>75 g of KBr | 20° C. |

Solutions 1 and 2 were simultaneously added to the initial solution using peristaltic pumps at 30° C. with vigorous stirring.

Grain size and the grain size distribution range are then determined.

TABLE 1

| | Grain size [μm] (median particle size by volume) | Distribution range* [%] |
|---|---|---|
| Emulsion 1 (Invention) | 0.121 | 49 |
| Emulsion 2 (Invention) | 0.143 | 55 |
| Emulsion 3 (Comparison) | 0.146 | 70 |
| Emulsion 4 (Invention) | 0.100 | 17 |
| Emulsion 5 (Comparison) | 0.158 | 28 |
| Emulsion 6 (Invention) | 0.062 | 25 |
| Emulsion 7 (Comparison) | 0.072 | 52 |

$$^{*}\text{Distribution range} = \frac{\text{variance}}{\text{average grain size}}$$

The results in table 1 show that the novel solids apportioning precipitation process results in narrower grain size distributions than the conventional precipitation technique using aqueous solutions.

I claim:

1. A process for the production of a silver halide emulsion in an aqueous protective colloid solution by the reaction of silver nitrate and at least one water-soluble halide including the step of adding during precipitation at least 50% by weight of the total quantity of at least one of the silver nitrate and the water-soluble halide in the form of a solid salt to the aqueous protective colloid solution.

2. A process according to claim 1 wherein the water-soluble halide is selected from the group consisting of alkali metal chlorides, ammonium chlorides, alkali metal bromides, ammonium bromides, alkali metal iodides and ammonium iodides.

3. A process according to claim 1 wherein at least 50% by weight of the total quantity of both the silver nitrate and the water-soluble halide is added in the form of solid salts thereof to the aqueous protective colloid solution.

4. A process according to claim 3 wherein the silver nitrate and the water-soluble halide in the form of the solid salts thereof are apportioned over a defined period of time using metering belt balances or using conveying screws.

5. A process according to claim 3 wherein the silver nitrate and the water-soluble halide in the form of the solid salts thereof are adjusted to an approximately equal temporal molar dissolution behavior.

6. A process according to claim 5 wherein the solid salts are apportioned in pelletized form.

7. A process according to claim 3 wherein the silver nitrate and the water-soluble halide are homogeneously mixed together in solid form before being apportioned into the aqueous colloid solution.

8. A process according to claim 7 wherein the homogeneous solid salt mixture of silver nitrate and water-soluble halide is produced and apportioned under red light or in darkness.

9. A process according to claim 7 including the step of adding a desiccant in solid form to the silver nitrate and the water-soluble halide in the form of the solid salts thereof, which desiccant is not itself added to the reaction vessel.

10. A process according to claim 7 including the step of cooling the silver nitrate and the water-soluble halide in the form of the solid salts thereof to below the freezing point of water.

11. A photographic silver halide emulsion at least in part produced using the process according to claim 1.

12. A photosensitive silver halide material containing at least one silver halide emulsion according to claim 11.

* * * * *

UNITED STATES PATENT AND TRADEMARK OFFICE
CERTIFICATE OF CORRECTION

PATENT NO. : 5,955,254
DATED : September 21,1999
INVENTOR(S) : OTTO LAPP

It is certified that error appears in the above-identified patent and that said Letters Patent is hereby corrected as shown below:

Column 1, line 19, "halice" should read -- halide --; line 62, "5 wt.%" should read -- 50 wt. % --.

Column 4, lines 11 and 19, "coloUr" should read -- colour --; and line 46, "scavenger" should read -- scavengers --.

Signed and Sealed this

Eighteenth Day of April, 2000

*Attest:*

Q. TODD DICKINSON

*Attesting Officer*

*Director of Patents and Trademarks*